(12) United States Patent
Bertocchi

(10) Patent No.: US 12,369,613 B2
(45) Date of Patent: Jul. 29, 2025

(54) MACHINE FOR TREATING FOOD PRODUCTS OF VEGETABLE ORIGIN FOR PRODUCING JUICE AND RELATED METHOD FOR TREATING

(71) Applicant: Alessandro Bertocchi, Parma (IT)

(72) Inventor: Alessandro Bertocchi, Parma (IT)

( * ) Notice: Subject to any disclaimer, the term of this patent is extended or adjusted under 35 U.S.C. 154(b) by 898 days.

(21) Appl. No.: 17/618,455

(22) PCT Filed: Jun. 9, 2020

(86) PCT No.: PCT/IB2020/055422
§ 371 (c)(1),
(2) Date: Dec. 11, 2021

(87) PCT Pub. No.: WO2020/250132
PCT Pub. Date: Dec. 17, 2020

(65) Prior Publication Data
US 2022/0312820 A1   Oct. 6, 2022

(30) Foreign Application Priority Data

Jun. 11, 2019   (IT) .................. 102019000008622

(51) Int. Cl.
*A23N 1/02*      (2006.01)
*A23L 2/04*      (2006.01)

(52) U.S. Cl.
CPC . *A23N 1/02* (2013.01); *A23L 2/04* (2013.01)

(58) Field of Classification Search
CPC . A23N 1/00; A23N 1/02; A23N 1/003; A23N 1/006
See application file for complete search history.

(56) References Cited

U.S. PATENT DOCUMENTS

| | | | | |
|---|---|---|---|---|
| 2,360,964 A | * | 10/1944 | Moroni | ..................... A23N 1/00 99/496 |
| 2,389,862 A | | 11/1945 | McGihon | |
| 4,104,414 A | * | 8/1978 | Rahman | .................... A23L 2/14 426/489 |

(Continued)

FOREIGN PATENT DOCUMENTS

| | | |
|---|---|---|
| EP | 0511174 A1 | 10/1992 |
| WO | 2004091323 A1 | 10/2004 |

(Continued)

*Primary Examiner* — Sean M Michalski
(74) *Attorney, Agent, or Firm* — Maschoff Brennan

(57) ABSTRACT

A machine for treating a food product of vegetable origin includes a treatment section having an inlet for feeding the food product and an outlet for discharging a treated product. The treatment section has a fixed hollow body, cylindrical, or conical, shaped, and a rotor substantially cylindrical shaped having a diameter $\phi r$, or substantially conical shaped having a minimum diameter $\phi r$. The rotor is mounted within the fixed hollow body, has blades, and is operatively connected to a motor group to cause a rotation of the rotor at a rotation speed vr. The rotate such that the product ($\phi rvr$) of the diameter, or the minimum diameter, $\phi r$ and the rotation speed vr is greater than 700000 r.p.m·mm, whereby the food product is subject to a dynamic compression force, which causes a containment part of the food product to be broken and the liquid fraction, or juice, to exit outside.

19 Claims, 12 Drawing Sheets

(56) References Cited

U.S. PATENT DOCUMENTS

| | | | | |
|---|---|---|---|---|
| 4,301,183 A * | 11/1981 | Giguere | .................... | B02C 9/02 |
| | | | | 426/482 |
| 4,643,085 A * | 2/1987 | Bertocchi | ................ | A23N 1/00 |
| | | | | 241/260 |
| 5,283,078 A * | 2/1994 | Bertocchi | ................ | A23N 1/02 |
| | | | | 426/482 |
| 5,906,154 A * | 5/1999 | Yoon | ........................ | A23N 1/00 |
| | | | | 100/145 |
| 8,367,132 B2 * | 2/2013 | Bertocchi | ................ | A23N 1/02 |
| | | | | 426/489 |
| 9,027,472 B2 * | 5/2015 | Bertocchi | ................ | A23N 1/02 |
| | | | | 99/504 |
| 9,814,254 B2 * | 11/2017 | Bertocchi | ................ | A23N 1/02 |
| 11,044,934 B2 * | 6/2021 | Bertocchi | ................ | B30B 9/125 |
| 11,304,430 B2 * | 4/2022 | Bertocchi | ................ | A23N 1/00 |
| 12,178,232 B2 * | 12/2024 | Bertocchi | ................ | A23N 1/02 |
| 2011/0083566 A1* | 4/2011 | Backus | ................. | A23N 1/003 |
| | | | | 241/37.5 |
| 2016/0353790 A1* | 12/2016 | Bertocchi | ................ | A23N 1/00 |
| 2017/0164776 A1* | 6/2017 | Floessholzer | ......... | A47J 19/027 |
| 2017/0367398 A1* | 12/2017 | Cui | .......................... | A23N 1/02 |
| 2022/0378079 A1* | 12/2022 | Bertocchi | ................ | A23L 2/04 |

FOREIGN PATENT DOCUMENTS

| | | |
|---|---|---|
| WO | 2006037597 A2 | 4/2006 |
| WO | 2009/063309 A2 | 5/2009 |

\* cited by examiner

MACHINE FOR TREATING FOOD PRODUCTS OF VEGETABLE ORIGIN FOR PRODUCING JUICE AND RELATED METHOD FOR TREATING

FIELD OF THE INVENTION

The present invention relates to the field of food industry, and in particular relates to a machine for treating food products of vegetable origin for producing juice, and, in a less quantity, puree, from food products of vegetable origin, e.g. fruits and vegetables.

The invention relates, furthermore, to a method for treating food products of vegetable origin and to a method for producing juice starting from such food products.

BACKGROUND OF THE INVENTION

As it is known, different typologies of plants exist for extracting juice, or puree, from food product of vegetable origin, in particular fruits and vegetables.

In general, in a first step, the product is softened, or ground, more, or less, finely, and then, in a second step, is introduced into a machine, normally an extractor, which divides the softened product, in a main product, i.e. the juice, or the puree, and in a waste product comprising the seeds, the skins, etc. The extracting machines of prior art are constituted by a fixed structure, which comprises a perforated sheet metal having cylindrical, or conical, shape, that is known as "sieve", and a rotor provided with blades that rotates within the sieve. The rotor is mounted on a shaft and is caused to quickly rotate by a motor group.

In the first softening step the product is subject to a series of pulses in quick succession, obtained by a cylindrical, or conical, body having protruding portions at the internal surface, and by a rotor provided with blades, which rotates within the fixed body and applies a centrifugal force on the pulps pushing them against the protruding portions, generating the pulses, which cause the softening. See at this regard EP0511174.

In the second extracting step that is carried out by an extractor, the ground, or softened, product is radially pushed owing to the centrifugal force against the sieve. In this way, the main product, i.e. the puree and the liquid fraction, i.e. the juice, of the main product are filtered through holes and, therefore, discharged through an outlet to be subject to further treatments. The parts which do not pass through the sieve, instead, move axially along the sieve and are conveyed to another outlet, which is positioned at the opposite side with respect to the inlet, where they are discharged from the machine. An example of extractor machine having these characteristics is described in U.S. Pat. No. 4,643,085.

Other examples of prior art processes and apparatuses for producing juice, or puree, from food products are described in U.S. Pat. No. 2,389,862, US2016/353790 and WO2009/063309.

In particular, in U.S. Pat. No. 2,389,862 a machine is described for extracting juice and puree food products. The machine comprises a rotor, which rotates within a stator and operated by a motor to cause the processed food product to be ground.

However, the aforementioned processes and the aforementioned prior art machines normally have a low yield in juice.

Therefore, in order to increase the yield in juice, the puree, which is, for example, obtained by extraction carried out in the aforementioned extractor machine, or alternatively, the ground product obtained upstream of the same, is added with enzymes, which are able to break the cell structure causing the liquid to exit outside. Then, the liquid is divided from the residues of puree, and waste, in case this is present, such as seeds and skins, by separating by sieves, or specific membranes, or by centrifugation.

Another process for maximizing the yield in juice provides, instead, to subject the product to a slow mechanical compression carried out by hydraulic, or pneumatic, presses, or filter belt presses, where the pressure breaks the cells and the liquid product is filtered through belts, or membrane filters.

In a further alternative embodiment of prior art, the process for producing juice provides to use both the aforementioned treatments, that means at first before enzyme treatment and then the mechanical compression.

However, the aforementioned prior art processes for producing juice are complex and provides, anyway, low yields in juice. In addition to the above, both enzyme treatment due to the use of synthetic compounds, and the mechanical compression due to the energetic action, unavoidably, change the organoleptic properties of the final product.

SUMMARY OF THE INVENTION

It is, therefore, an object of the invention to provide a machine for treating food products of vegetable origin for juice production that is able to solve the aforementioned drawbacks of the known processes.

It is, in particular, object of the invention to provide a similar machine that is able to maximize the yield in juice of the treated product.

It is also object of the invention to provide a method for treating food products of vegetable origin for juice production having the same advantages.

It is furthermore object of the invention to provide a plant for producing juice from food products of vegetable origin for producing juice, or puree, having the same advantages.

These and other objects are achieved by a machine, according to the invention, for treating a food product of vegetable origin, said machine comprising a treatment section provided with an inlet for feeding said food product of vegetable origin to be treated and with at least an inlet for discharging a treated product, said treatment section being equipped with a fixed hollow body, cylindrical, or conical, shaped, with a rotor substantially cylindrical shaped having a predetermined diameter $\phi r$, or substantially conical shaped with a predetermined minimum diameter $\phi r$, and mounted within said fixed hollow body, said rotor being provided with a plurality of blades, said rotor being operatively connected to said motor group configured to cause said rotor to rotate about a rotation axis at a predetermined rotation speed vr expressed in r.p.m., whose main characteristic is that the motor group is configured to cause said rotation in such a way that the product of the diameter, or the minimum diameter, $\phi r$ and the rotation speed vr of the rotor, i.e. $\phi r \cdot vr$, is greater than 700000 r.p.m·mm, whereby the food product of vegetable origin is subject to a dynamic compression force, which causes the cellular structure to be broken and, therefore, the liquid fraction, or juice, which is contained in the same to exit outside the solid fraction.

In particular, the solution according to the present invention provides to cause a series of collisions of the processed food product of vegetable origin against the internal surface of the fixed hollow body. More in particular, the internal surface of the fixed hollow body has a hardness higher than the hardness of the cellular structure of the vegetable pulp, therefore, the collisions, i.e. the violent and many dynamic compressions, which occur, cause a gradual breaking of the containment part, or membrane, of the cellular structure of the food product of vegetable origin and, therefore, the liquid fraction of the same to exit outside. Therefore, the present invention, differently from the prior art solutions directed to produce puree, is directed to provide a very high quantity of motion to the particles of the food product of vegetable origin in such a way to force them to hit against the internal surface of the fixed hollow body, that gradually causes the containment membrane of the liquid fraction to be broken. Preferably, the internal surface of the fixed hollow body provides a plurality of impact surfaces connected by a plurality of connection surfaces. In this way, the aforementioned technical effect is obtained by a plurality of collisions obtained by causing by the blades of the rotor a succession of violent collisions of the processed product against the aforementioned plurality of impact surfaces.

In the prior art solutions, as for example described in EP0511174 the aforementioned treatment is not carried out, because the desired main product to be obtained is constituted from puree, and not from juice. Therefore, the rotor of the machine is rotated at a speed of rotation that is sufficiently high to allow the machine to divide the pulp from the skin, but, at the same time, not higher than a determined value, in such a way to avoid, as anticipated above, to produce juice that is not a desirable product in the prior art machines.

Other technical characteristics of the present invention and related embodiments are set out in the dependent claims.

According to another aspect of the invention, a method for treating a food product of vegetable origin comprises the steps of:

feeding the food product of vegetable origin to be treated in a treatment section comprising a fixed hollow body, which is cylindrical, or conical shaped, and a rotor substantially cylindrical shaped and having a predetermined diameter $\phi r$, or substantially conical shaped and having a predetermined minimum diameter $\phi r$, said rotor being mounted within the fixed hollow body and being provided with a plurality of blades;

actuating a motor group operatively connected a said rotor and configured to cause a rotation of said rotor about a rotation axis at a predetermined rotation speed vr;

wherein the actuating step of the motor group is such that the product of the diameter $\phi r$ of the rotor and the rotation speed vr of the rotor, i.e. $\phi r \cdot vr$, is greater than 700000 r.p.m·mm, whereby the food product of vegetable origin is subject to a dynamic compression force, which causes the breaking and the resulting exit of the liquid fraction, or juice, contained within the solid fraction.

In particular, the treated product exiting the treatment section can be subject to an extraction step within an extraction section to divide the treated product in a first portion more liquid from a second portion more solid. More in particular, the extraction section can be equipped with:

a fixed sieve having cylindrical, or conical, shape, and provided with a plurality of holes having a predetermined diameter;

a rotor configured to rotate within the fixed sieve to impress a centrifugal force to the treated food product of vegetable origin against said sieve, in such a way to divide said treated food product of vegetable origin in said first portion which passes through said holes of said fixed sieve and is discharged from the extraction section through a first outlet, and in the second portion which, instead, does not pass through the holes of the fixed sieve and is discharged through a second outlet arranged downstream of the first outlet with respect to the advancing direction of the food product of vegetable origin along the extraction section.

In a possible embodiment of the invention, the first portion of product exiting the extraction section is subject to a deaeration step up to reach a predetermined vacuum degree.

In particular, the deaerated product can be then subject to a thermal treatment in a thermal treatment section.

More in particular, the aforementioned thermal treatment can be selected from the group comprising:

a heating step of the deaerated product at a temperature comprised between 45° C. and 70° C., in such a way to reach an activation temperature;

a heating step of the deaerated product up to reach a temperature comprised between 70° C. and 95° C., in such a way to reach an inactivation temperature.

In particular, the product exiting the aforementioned treatment section, or the first portion of the product exiting the extraction section, or the thermally treated product exiting the thermal treatment section, depending on the embodiment of the method that is used, can be subject to a dividing step to divide a lighter part, in particular the liquid fraction of said product, from a heavier part, in particular the solid fraction of said product.

Preferably, the dividing step can be selected from the group comprising:

a centrifugation step, in particular carried out by a centrifugation device;

a sedimentation step, in particular a static, or dynamic, sedimentation step, advantageously carried out by a "decanter".

According to a further aspect of the invention, a plant for producing juice starting from a food product of vegetable origin can comprise at least a machine for treating as described above and at least a machine for dividing the treated product exiting the machine for treating in a main part constituted from juice, and a 10 secondary part, constituted from puree, skins, and seeds.

According to still a further aspect of the invention, a machine for treating a food product of vegetable origin can comprise a treatment section provided with an inlet for introducing the food product of vegetable origin to be treated and at least an outlet for discharging a treated product. In particular, the aforementioned treatment section can be equipped with a fixed hollow body, cylindrical, or conical, shaped, and with a rotor substantially cylindrical shaped, or substantially conical shaped, mounted within of the fixed hollow body, preferably providing a plurality of blades. The rotor can be operatively connected to a motor group configured to cause the rotor to rotate about a rotation axis at a predetermined rotation speed. More in particular, the aforementioned fixed hollow body can have an internal surface comprising a plurality of impact surfaces against which said plurality of blades of said rotor is arranged to push said treated food product of vegetable origin in such a way to subject the same to a succession of collisions and, thus, to cause the containing part of the food product of vegetable origin to be broken, and the liquid fraction to exit outside.

Advantageously, the aforementioned plurality of impact surfaces is connected by a plurality of connection surfaces.

In particular, each impact surface can be oriented, in such a way that the rotor blades have a impact angle $\alpha$, which can change during rotation of rotor 30. Advantageously, the aforementioned impact angle changes during rotation of rotor with respect to the impact 10 surface between 0° and 45°.

BRIEF DESCRIPTION OF THE DRAWINGS

The invention will be now illustrated with the following description of an exemplary embodiment thereof, exemplifying but not limitative, with reference to the attached drawings wherein.

Figure 12:
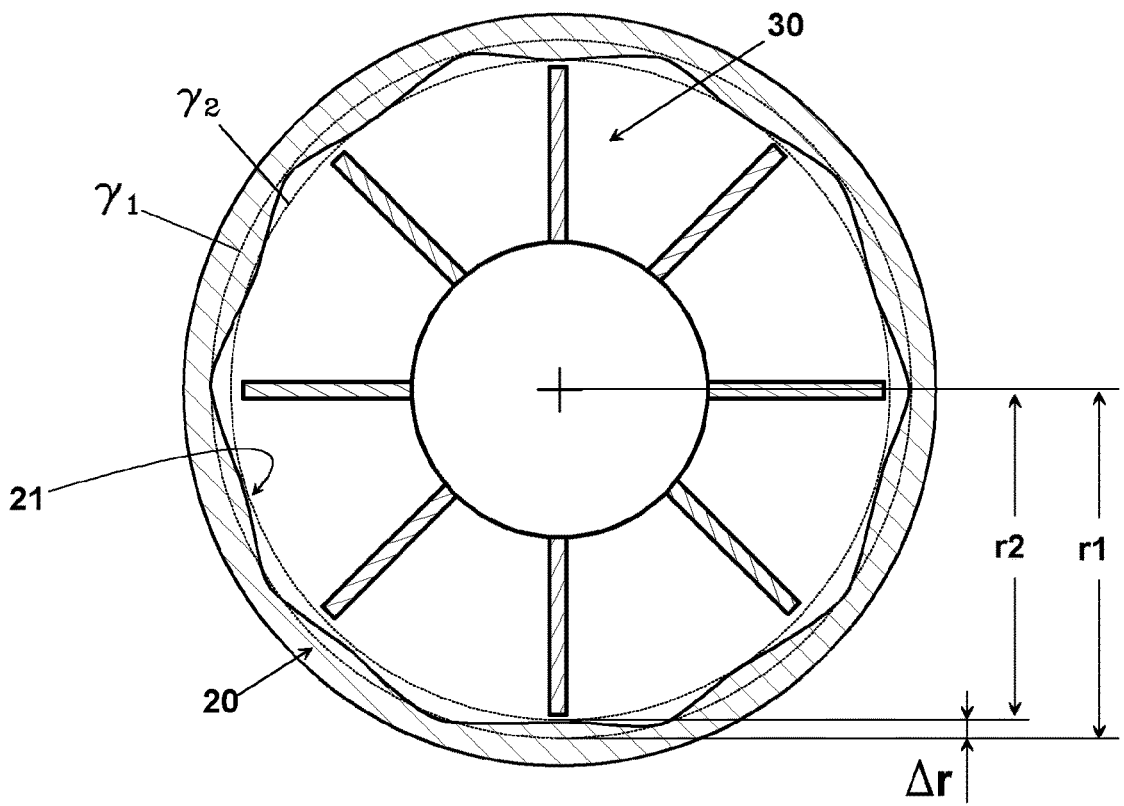
Figure 13:
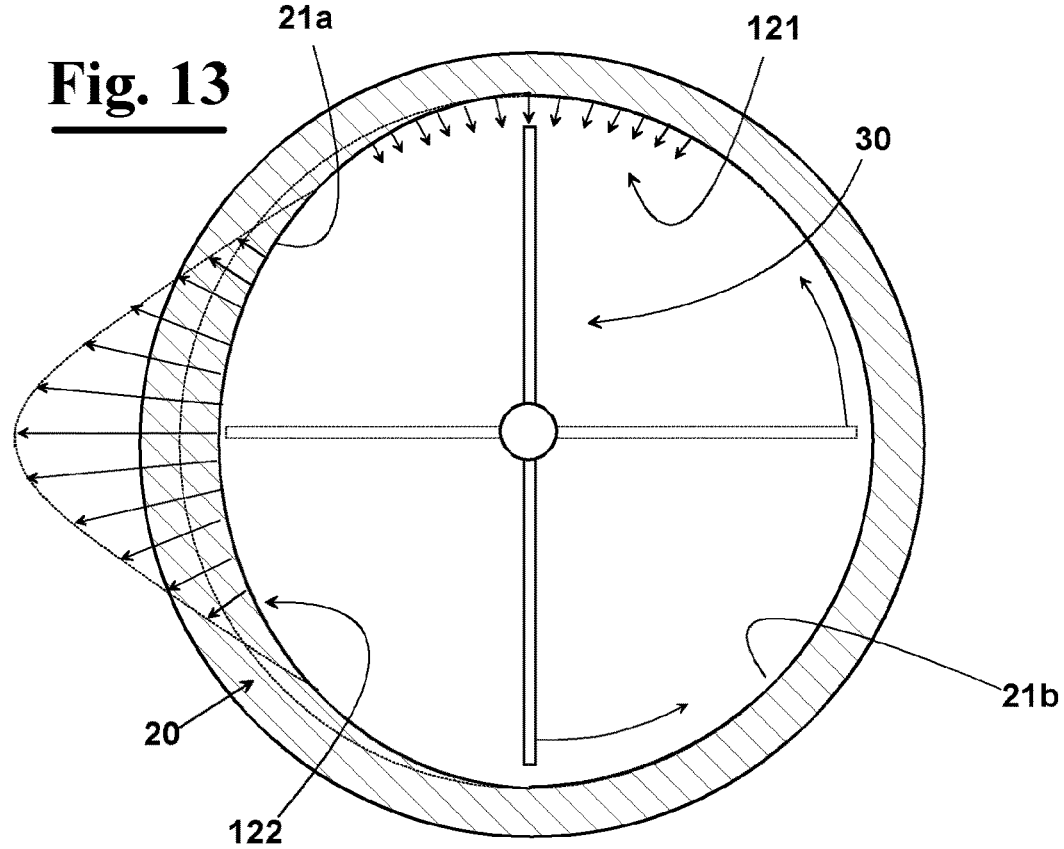
Figure 14A:
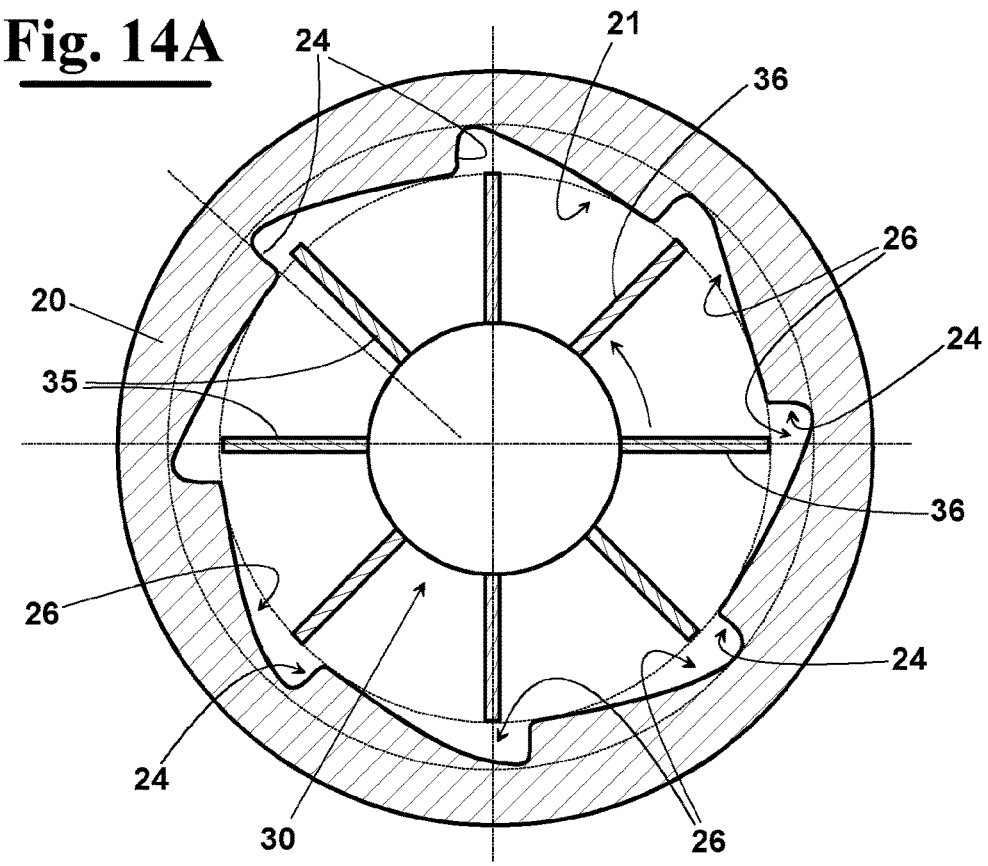
Figure 14B:
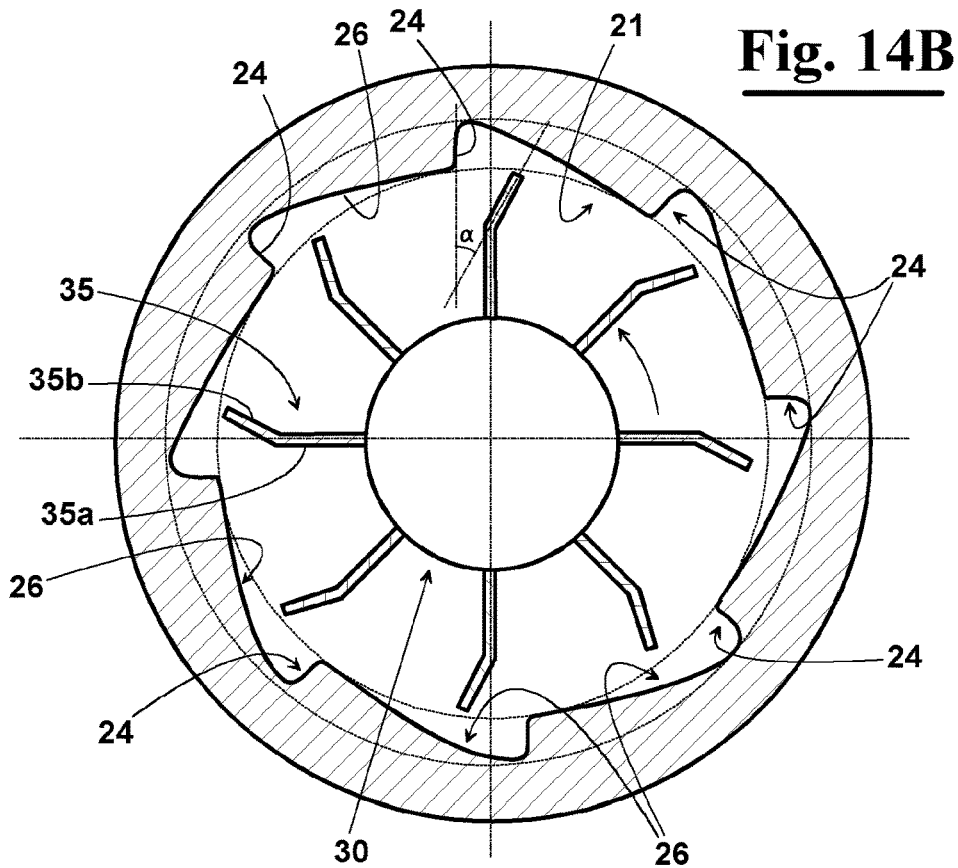

the figures from 8 to 11 show further embodiments of the method, according to the invention, for producing juice starting from a food product of vegetable origin;

the FIGS. 12 and 13 diagrammatically show transversal cross-section views of other possible alternative embodiments of the machine for treating according to the invention;

the FIGS. 14A and 14B show transversal cross-section views of a further possible alternative embodiment of the machine for treating according to the invention.

DETAILED DESCRIPTION OF SOME EXEMPLARY EMBODIMENTS OF THE INVENTION

Figure 1A:
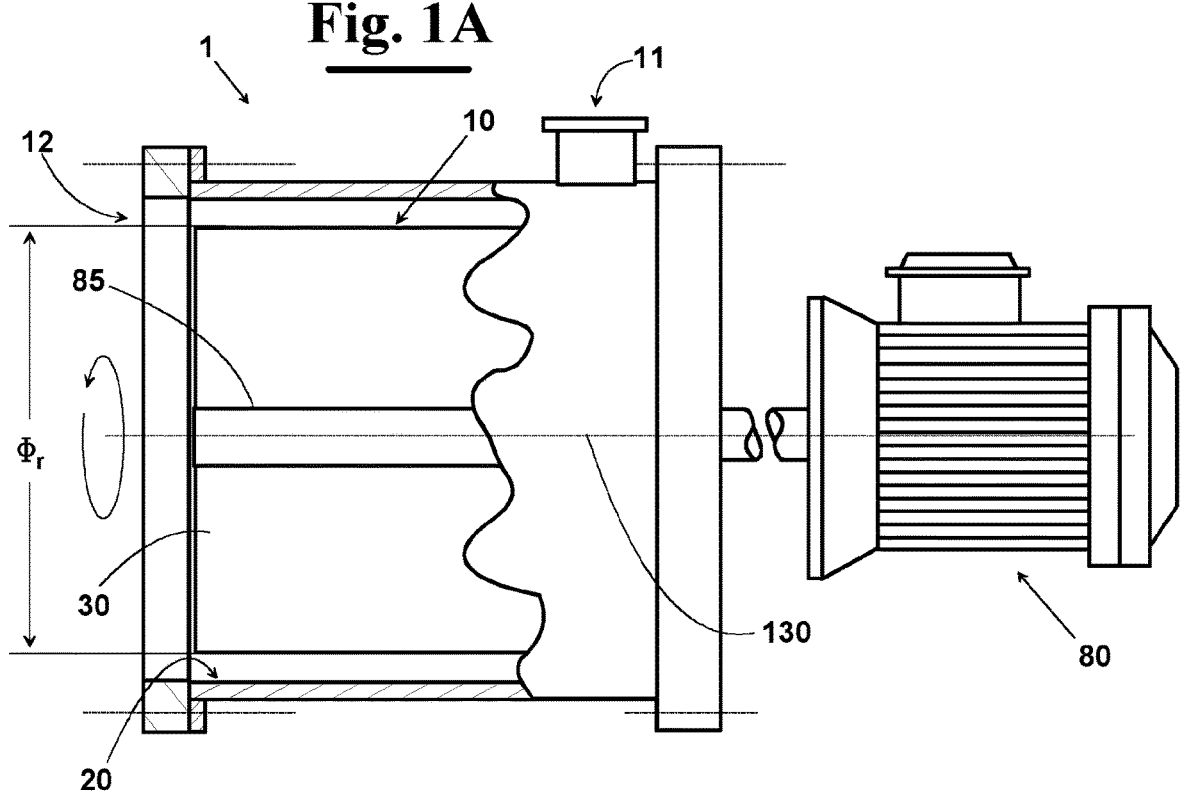
FIG. 1A diagrammatically shows a side elevation view partially sectioned of a first embodiment of a machine, according to the invention, for treating a food product of vegetable origin for producing juice.
Figure 1B:
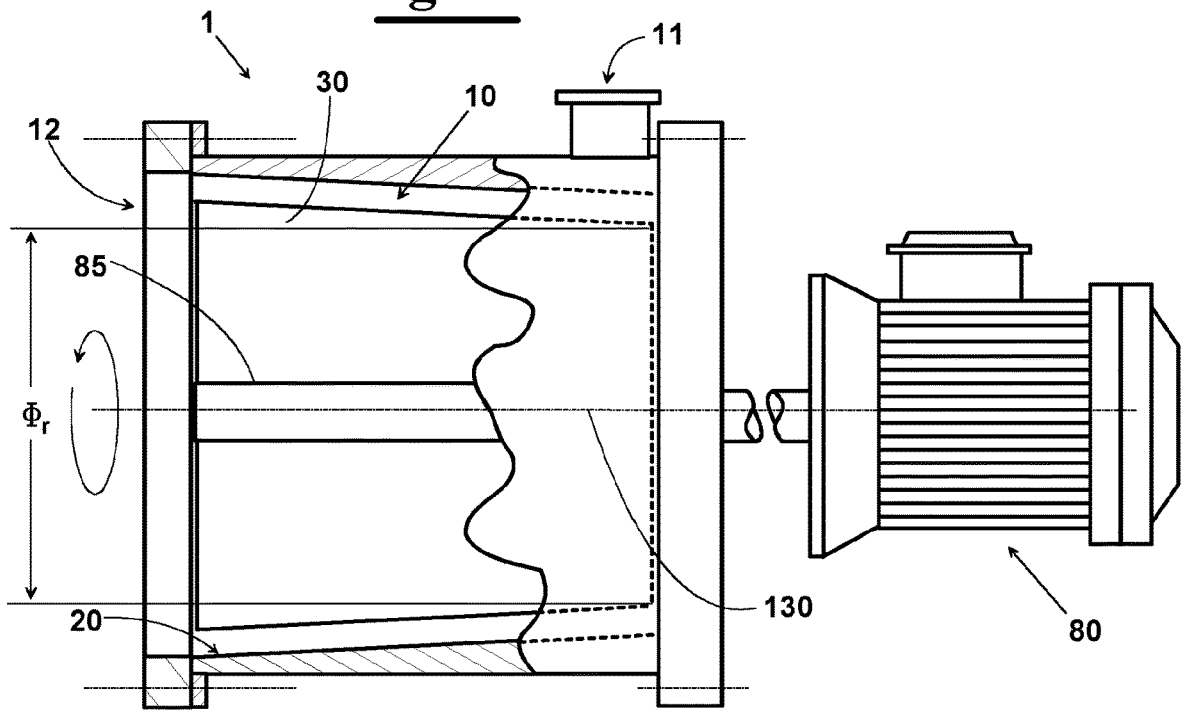
FIG. 1B diagrammatically shows a side elevation view partially sectioned, a prima alternative embodiment of the machine for treating a food product of vegetable origin of FIG. 1A.

In the FIGS. 1A and 1B are diagrammatically shown as an example two possible embodiments of a machine 1 for treating a original food product of vegetable origin 100, or pre-treated. The machine 1 provides, in particular, a treatment section 10 provided with a fixed hollow body 20 cylindrical shaped (FIG. 1), or conical shaped (FIG. 2), and a rotor 30, also this cylindrical shaped, or 10 substantially cylindrical shaped, and having a predetermined diameter $\phi r$, or conical, or substantially conical, and having a predetermined minimum diameter $\phi r$.

In particular, the rotor 30 provides a predetermined number of blades and is mounted within the fixed hollow body 20. In particular, the rotor 30 is configured to rotate within the fixed hollow body 20 about a rotation axis 130. In the following description, if the rotor 30 has a conical shape, with diameter $\phi r$ this is to be intended to be the minimum diameter of the same (see FIG. 2). If the rotor 30 has a cylindrical shape the diameter, or the aforementioned minimum diameter, $\phi r$ will be constant along the length of the same. In particular, the aforementioned diameter, or minimum diameter, $\phi r$ of rotor 30 can be set between 250 mm and 1000 mm.

The machine 1 provides, furthermore, a motor group 80 operatively connected to rotor 30 by a motor shaft 85 arranged to cause the aforementioned rotation of rotor 30 about the rotation axis 130 at a predetermined rotation speed vr, for example expressed in r.p.m. More in detail, according to the present invention, the motor group 80 is configured to cause the aforementioned rotation of rotor 30 in such a way that the product of diameter $\phi r$ and rotation speed vr, i.e. $\phi r \cdot vr$ is greater than 700000 r.p.m·mm. The particular operative solution provided by the present invention allows to generate a dynamic compression force on the fibres and on the single cells of the food products of vegetable origin. This causes a breaking of the treated food product of vegetable origin and therefore the exiting of the liquid fraction from the solid fraction of which is constituted. Therefore, the present invention allows to obtain an analogous effect to that obtained by complex processes of prior art, which provide the use of enzymes, or technical solutions with low yields that provide to carry out a slow mechanical compression.

The present invention allows, furthermore, to maximize the yield in liquid fraction, i.e. juice, of the machine for treating 1, by subjecting the starting food product of vegetable origin to an energetic treatment, without, anyway, compromise the organoleptic properties of the final product.

Figure 2:
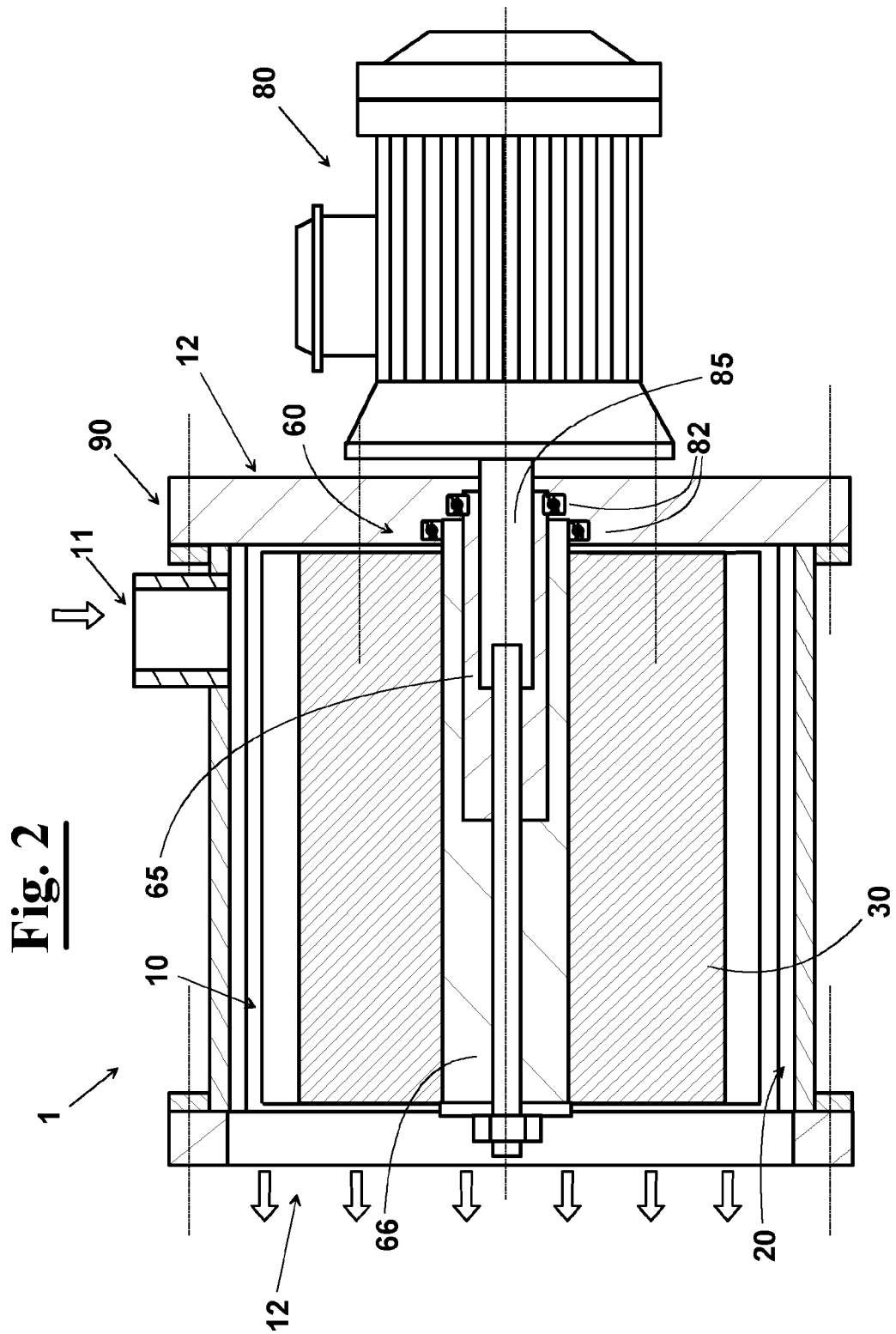
FIG. 2 diagrammatically shows a cross-section view of another alternative embodiment of the machine for treating a food product of vegetable origin of FIG. 1A.
Figure 3:
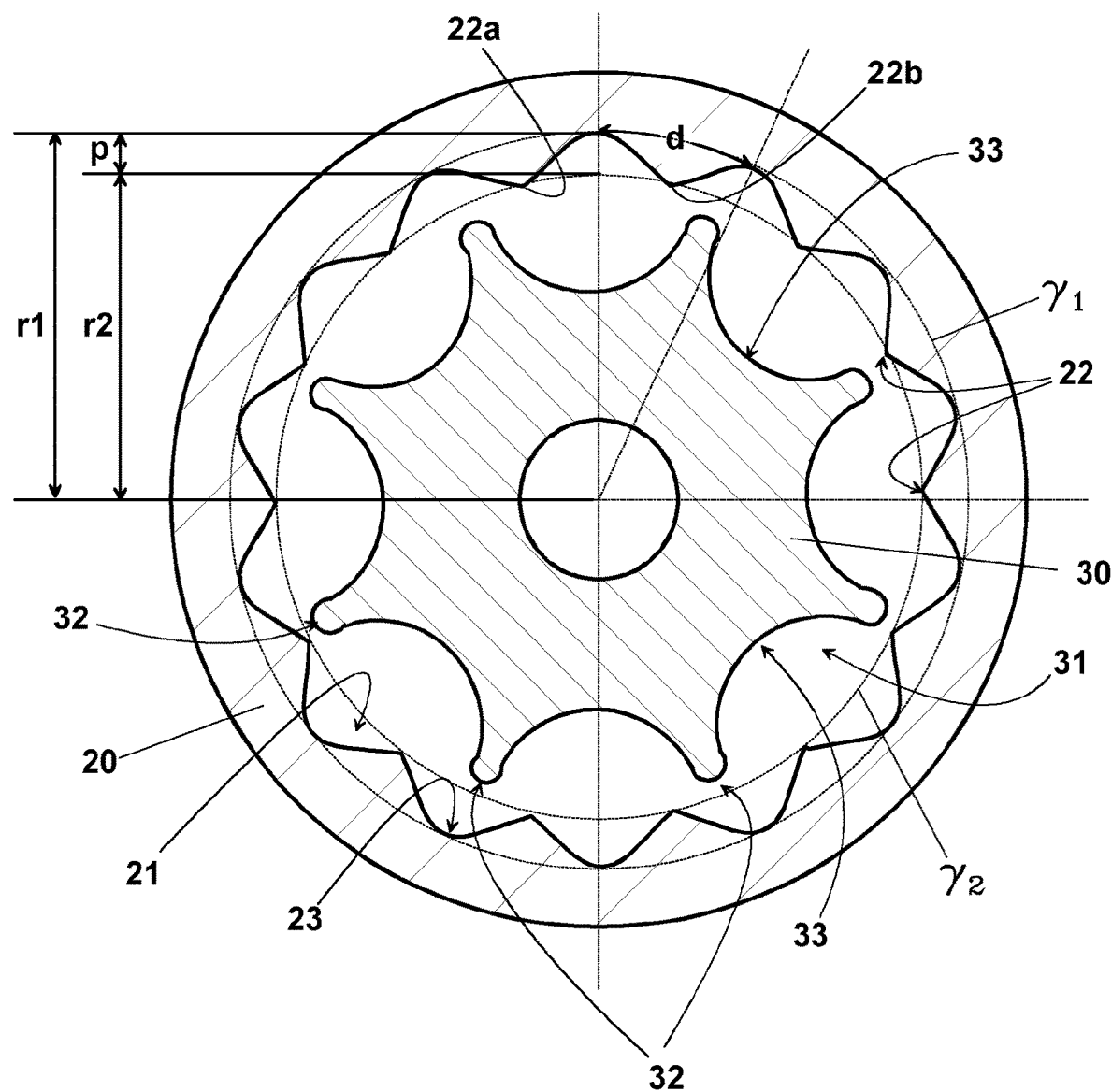
FIG. 3 diagrammatically shows a transversal cross-section view of another alternative embodiment according to the invention of the machine for treating a food product of vegetable origin of FIG. 1A.

As shown in the embodiment of FIGS. 2 and 3, the fixed hollow body 20 can provide a first surface 21 and the rotor 30 can provide a second surface 31, respectively, providing a plurality of protruding portions 22, 32, alternating with a plurality of recessed portions 23, 33, in such a way to subject, in use, the treated food product of vegetable origin 100 to a series of compression stresses in rapid succession. Therefore, in this case, the machine for treating, from a structural point of view, is similar to a softening machine of the type, for example, described in EP0511174. Advantageously, according to an embodiment of the invention, the ratio R between the circumferential distance between two successive protruding portions 22, in FIG. 3 the protruding portions 22a and 22b, i.e. the pitch P measured on the circumference of the fixed hollow body 20 and the depth H of each protruding portion 22 of the fixed hollow body 20, measured as the difference between the radius of circumference $\gamma 1$, which passes through all the protruding portions 22, and the circumference $\gamma 2$, which passes through all the recessed portions 23, can be set between 2 and 100, i.e. R=P/H=2%100. In this way, it is possible to exert a strong action on the treated food product of vegetable origin, without, anyway, compromising the organoleptic properties of the desired main product, i.e. the juice.

In particular, the aforementioned depth H of each protruding portion 22 can be set between 0.5 mm and 20 mm, for example between 2 mm and 4 mm.

Figure 4:
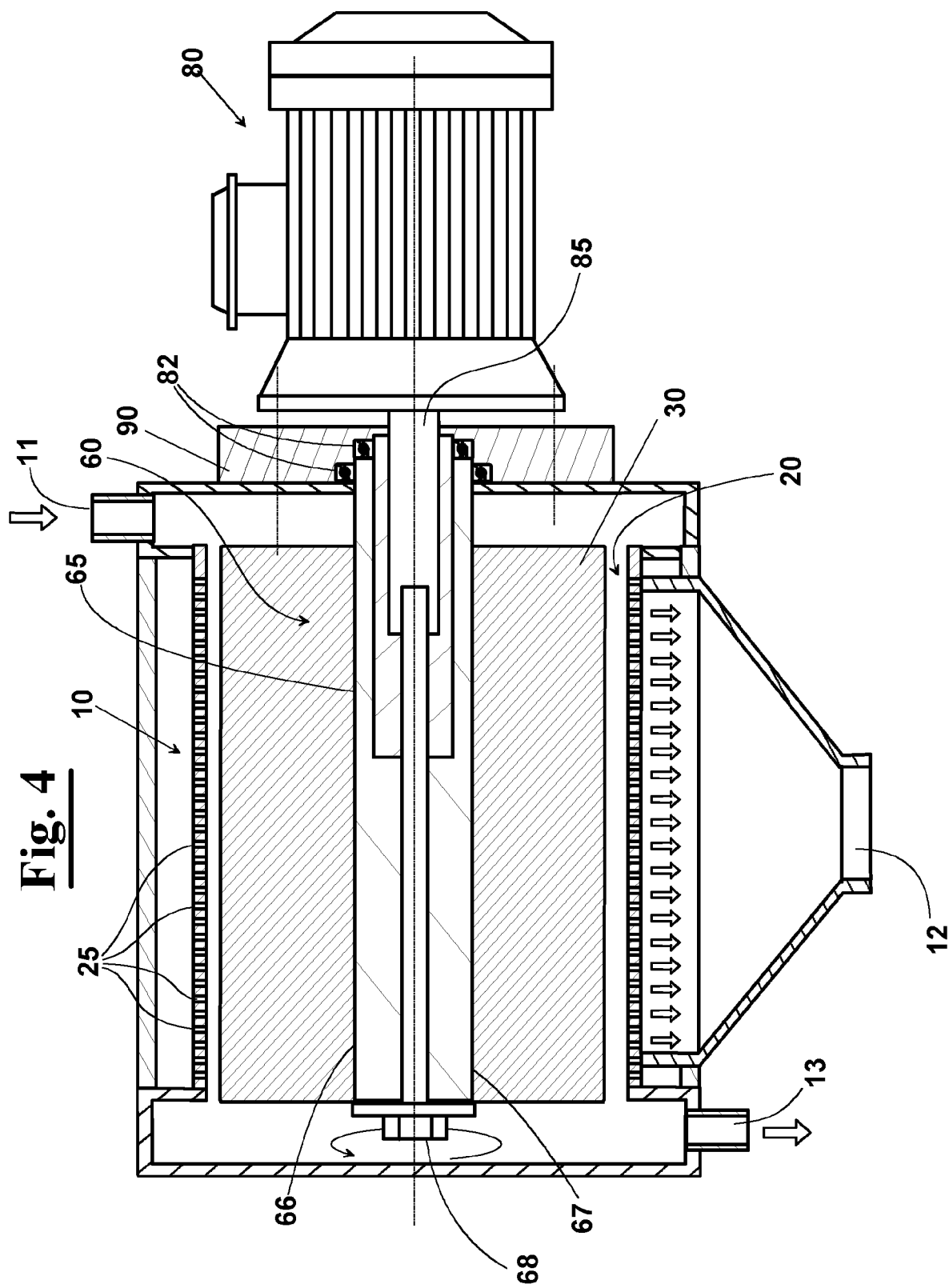
FIG. 4 diagrammatically shows a cross-section view of another alternative embodiment of the machine for treating a food product of vegetable origin of FIG. 1A.

In the alternative embodiment diagrammatically shown in FIG. 4, the fixed hollow body 20 of the treatment section 10 is, advantageously, provided with a plurality of holes 25 of a predetermined diameter. In particular, in this case, the rotor 30 is configured to rotate at the aforementioned rotation speed vr within the fixed hollow body 20, to cause, as described above, the food product of vegetable origin to be broken and the liquid fraction of the same to exit outside and, furthermore, to apply a centrifugal force on the treated food product of vegetable origin against the fixed hollow body 20. In this way, therefore, the food product of vegetable origin is divided into a first portion, more liquid, which passes through the holes 25 of sieve 20 and is discharged through a first outlet 12, and a second portion, more solid, which, instead, does not pass through the holes 22 of sieve 20 and is discharged through a second outlet 13. In particular, the first portion contains the juice of the processed food product of vegetable origin, whilst the second portion contains the waste, that means the skins, the seeds, of the product but also the puree of the food product of vegetable origin, or anyway, the more solid fraction of the same.

According to a particularly advantageous embodiment of the invention, diagrammatically shown both for the embodiment of FIG. 2 and the embodiment of FIG. 3, but anyway not to be considered as an essential feature of the invention, the rotor 30 can be connected to the motor shaft 85 by a connection group 60. This can comprise, in particular, a hub 65 mounted on the motor shaft 85, for example connected to the same by a key, or tongue. In particular, the connection group 60 can comprise, furthermore, a hollow connection member 66 mounted on the hub 65. More in detail the hollow connection member 66 provides a housing 67 arranged to house a connection shaft 68 arranged to engage at an end 68*a* a seat 64 of the hub 65 to make the hollow connection member 66 integral in rotation with hub 65. The hollow connection member 66 is, furthermore, peripherally provided with a plurality of blades 35 of the rotor 30, to which is fixed, for example, by welding. Furthermore, hydraulic sealing elements 82 are provided positioned between the connection group 60 and a connection flange 90 arranged to connect the motor group 80 to the treatment section 10. More in particular, first sealing elements 82*a* are provided positioned between the hub 65 and the connection flange 90 and second sealing elements 82*b* positioned between the hollow connection member 66 and flange 90. In this way, the necessary sealing conditions for machine 1 are guaranteed. In fact, in order to cause the breaking of the cells of food product of vegetable origin and the liquid fraction to exit outside, is necessary that motor group 80 operates at high speeds, considerably increasing the risk that the liquid fraction, i.e. the juice product, during the treatment, can infiltrate among the moving organs, i.e. the motor shaft and the other parts of the machine 1 with the possibility that can exit towards outside and to cause short circuits to the motor group 80.

Figure 5:
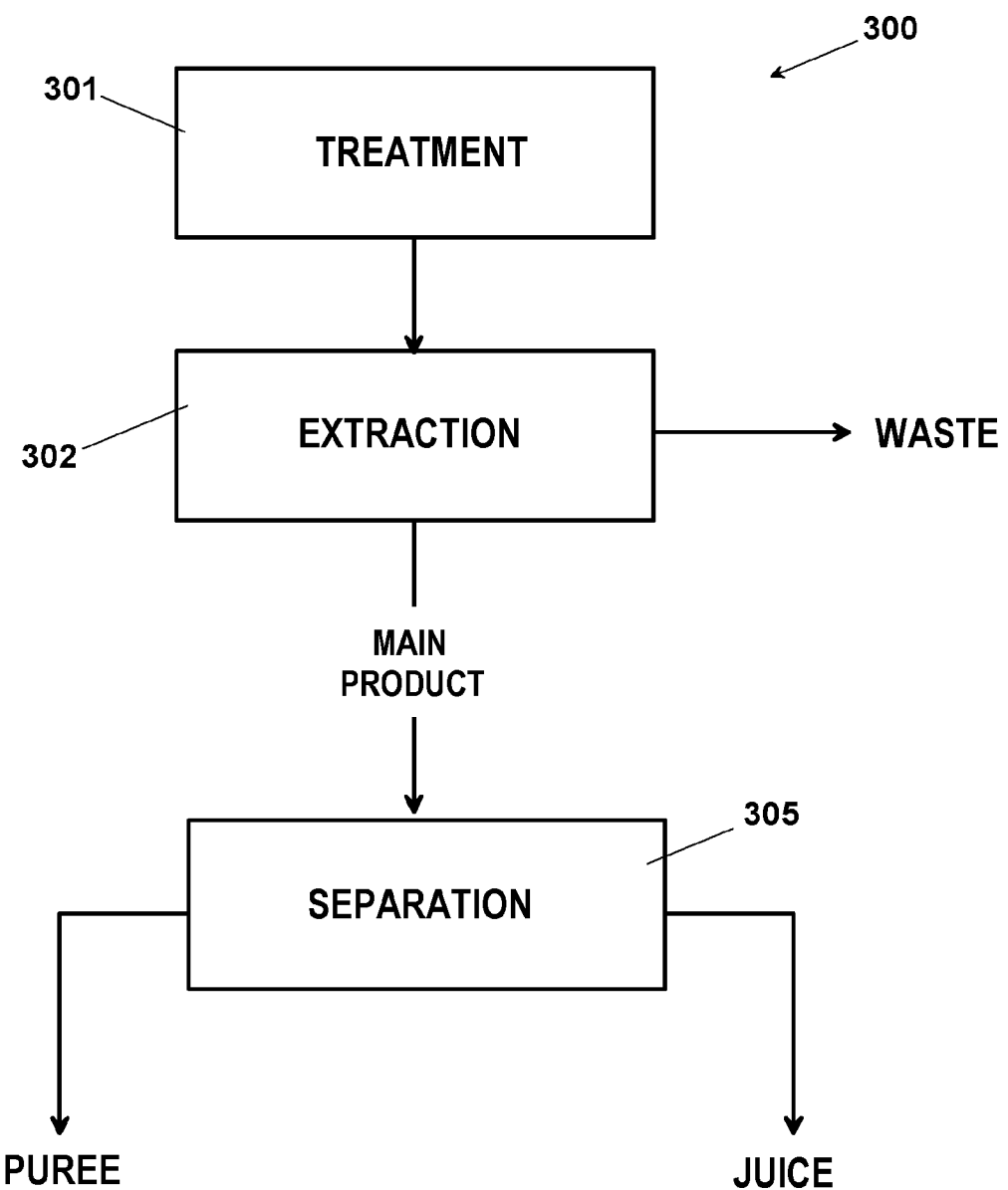
FIG. 5 shows a possible sequence of steps according to the method, according to the invention, for producing juice starting from a treated food product of vegetable origin that can be carried out by the machine for treating food product of vegetable origin according to the invention.
Figure 7:
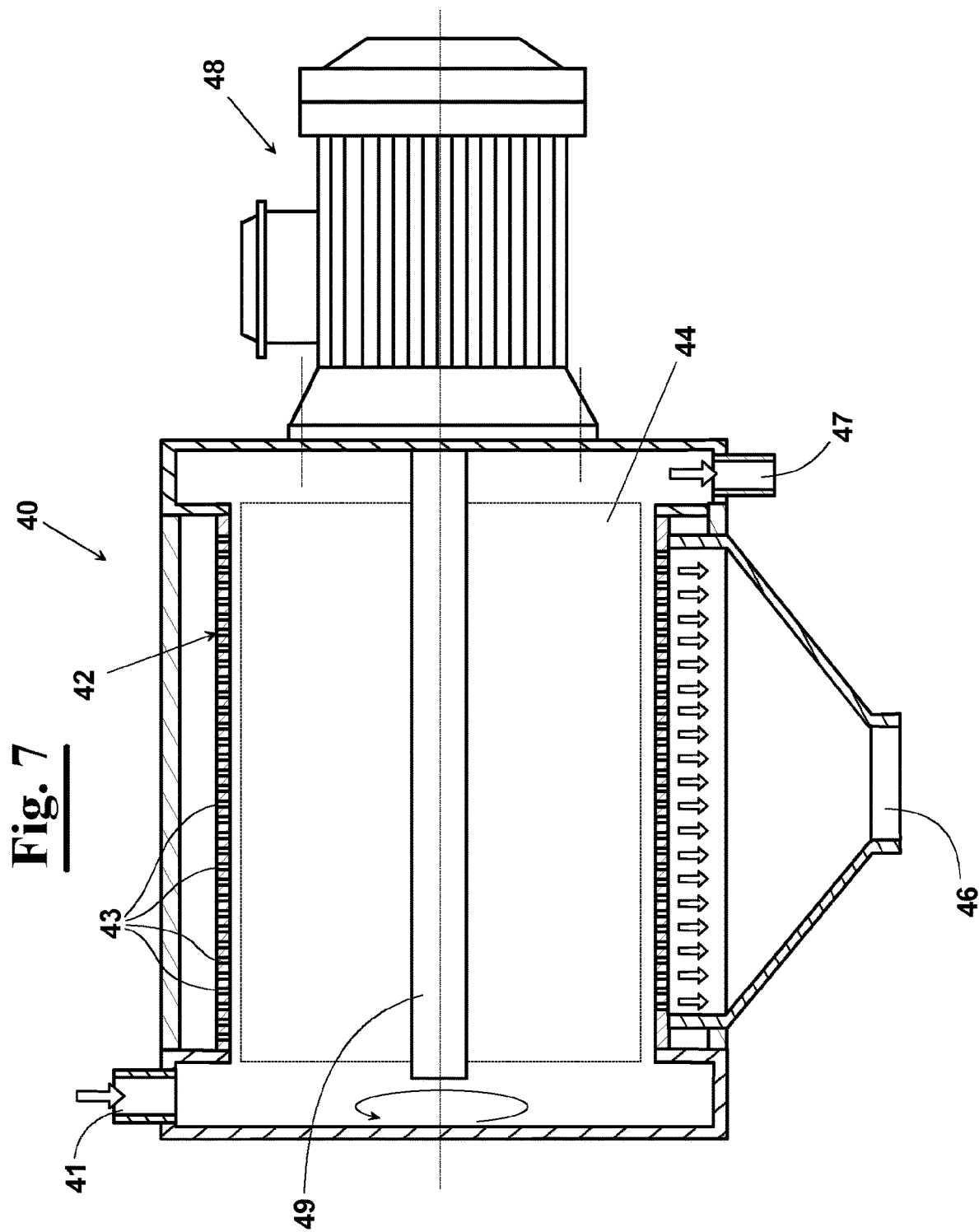
FIG. 7 diagrammatically shows a cross-section view of a possible embodiment of an extraction section provided by the method of FIGS. 5 and 6 for extracting juice from the food product treated in the treatment section.

In the figures from 5 to 6 and from 8 to 9, some possible succession of steps are diagrammatically shown of some alternative embodiments of a method, according to the invention, for producing juice starting from a treated food product of vegetable origin by machine 1 described above with reference to the figures from 1 to 4. In particular, according to a first embodiment of the invention that is shown in FIG. 5, the method provides to treat the original, or pre-treated food product of vegetable origin, within the treatment section 10 that is shown in the FIGS. 2 and 3, where the fixed body 20 does not provide holes 25 and, therefore, all the treated product is discharged through a single outlet, block 301. In this case, at the end of the treatment step, the treated food product of vegetable origin is subject to an extraction step, block 302, for example carried out by an extractor machine of the type described in U.S. Pat. No. 4,643,085. More in particular, the extraction step can be carried out in the extraction section 40 diagrammatically shown in FIG. 7, where the treated product is introduced thorough an inlet 41. In the extraction section 40 a fixed sieve 42 cylindrical, or conical, shaped, can be installed that is provided with a plurality of holes 43 having a predetermined diameter, and a rotor 44 configured to rotate within the aforementioned sieve 42 operated by a motor 48 to which is connected by a motor shaft 49. The rotor 44 is arranged to apply a centrifugal force on the treated food product of vegetable origin against the sieve 42, in such a way to divide the aforementioned food product of vegetable origin in a first portion which passes through the holes 43 of the sieve 42 and is discharged through a first outlet 46, and a second portion which, instead, does not pass through the holes of the sieve 42 and is discharged through a second outlet 47. The first portion of the product, which contains mainly juice, i.e. the liquid fraction, but also a determined quantity of solid fraction, i.e. puree of the food product of vegetable origin, discharged from the extraction section through the first outlet 46, can be subject to a dividing step, block 305 for example a static, or dynamic, sedimentation step, or a centrifugation step, to divide the lighter part of the product, in particular the liquid fraction of the product, i.e. the juice, from the heavier part, in particular the solid fraction of the product same, i.e. the puree.

Figure 6:
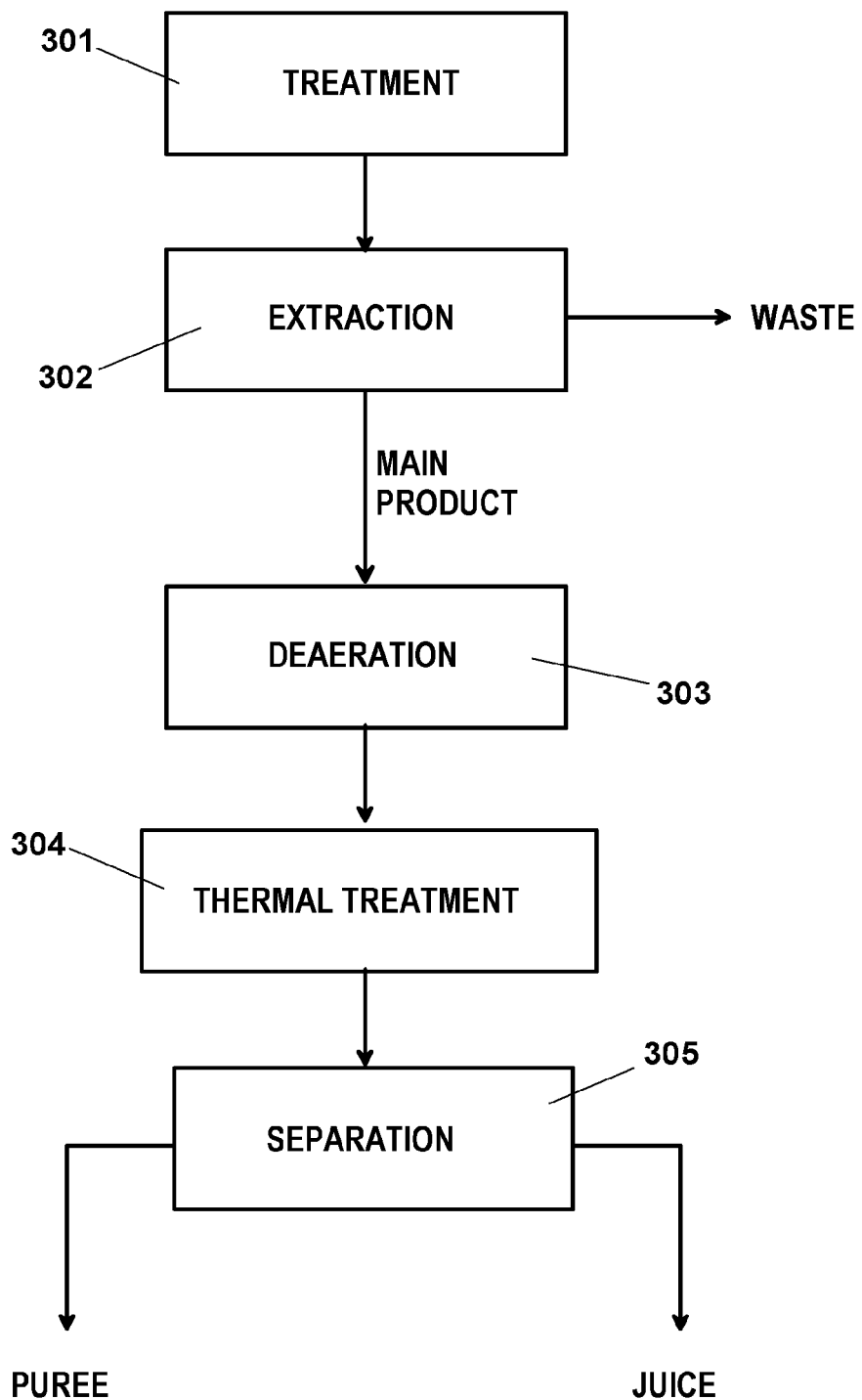
FIG. 6 shows a sequence of steps alternative to that of FIG. 5 of the method, according to the invention, for producing juice starting from a food product of vegetable origin.

In the alternative embodiment shown in FIG. 6, the method 300 after the treatment and extraction steps, blocks 301 and 302, described above with reference to FIG. 5, it is provided to subject the first portion discharged from the extraction section 40 through the first outlet 46, to a deaeration step, block 303, to subject the same, for example within a reservoir, to a predetermined vacuum degree to eliminate the air that is present in the same. The deaerated product is, then, subject to a thermal treatment, block 304. The thermal treatment can be, for example, a step of activation temperature, in this case the product is heated up to a temperature Tatt comprised between 50° C. and 60° C., or a step of inactivation temperature, in this case, the product is, instead, heated up a temperature Tina comprised between 85° C. and 95° C. Then, a dividing step, block 305, is provided analogous to that one described with reference to the figures showing the division of the juice from puree.

Figure 8:
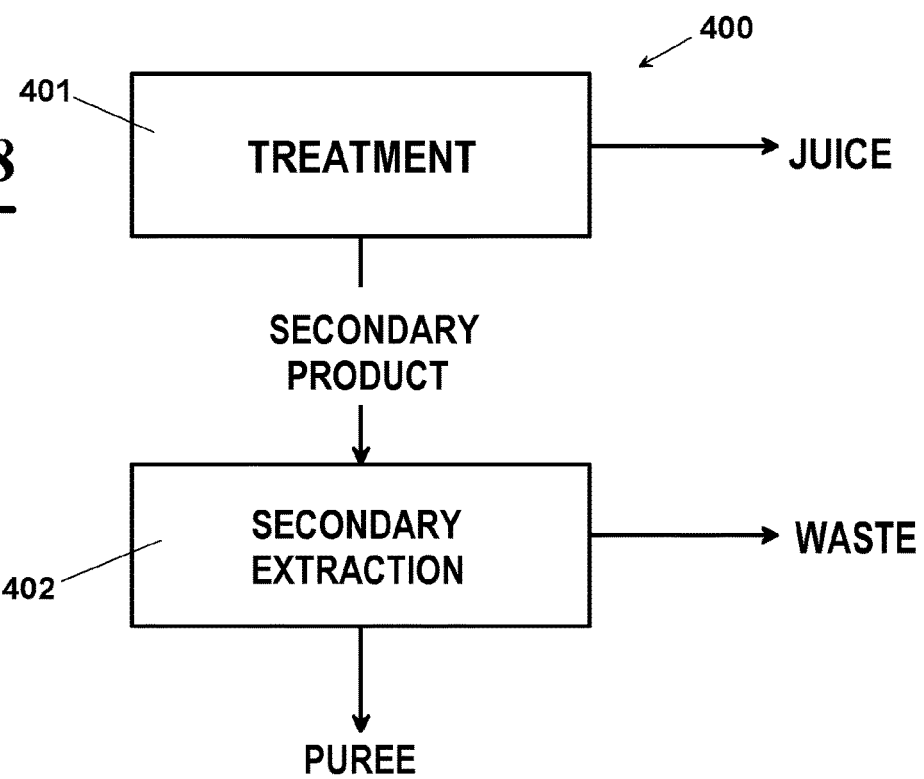

In the further alternative embodiment that is shown in FIG. 8, the treatment step, block 401, of the method 400, is carried out by the embodiment of the machine 1 described above with reference to FIG. 4. As anticipated above, in this case, besides of the aforementioned exiting of the liquid fraction from the solid fraction of the food product of vegetable origin that is obtained by the aforementioned dynamic collisions with high compression, the treatment step also provides a first division of the treated food product of vegetable origin in a main product, mainly the liquid fraction of the starting food product of vegetable origin, i.e. the juice, and a secondary product. This is subject to a secondary extraction step within a secondary extraction section, for example defined into an extractor as described above with reference to FIG. 7, to divide the secondary product in a more solid fraction, which does not pass through the holes of the sieve and is discharged as waste through the second outlet, and a less solid fraction still having a certain food value, in particular the puree of the starting food product of vegetable origin, which is discharged through the first outlet.

Figure 9:
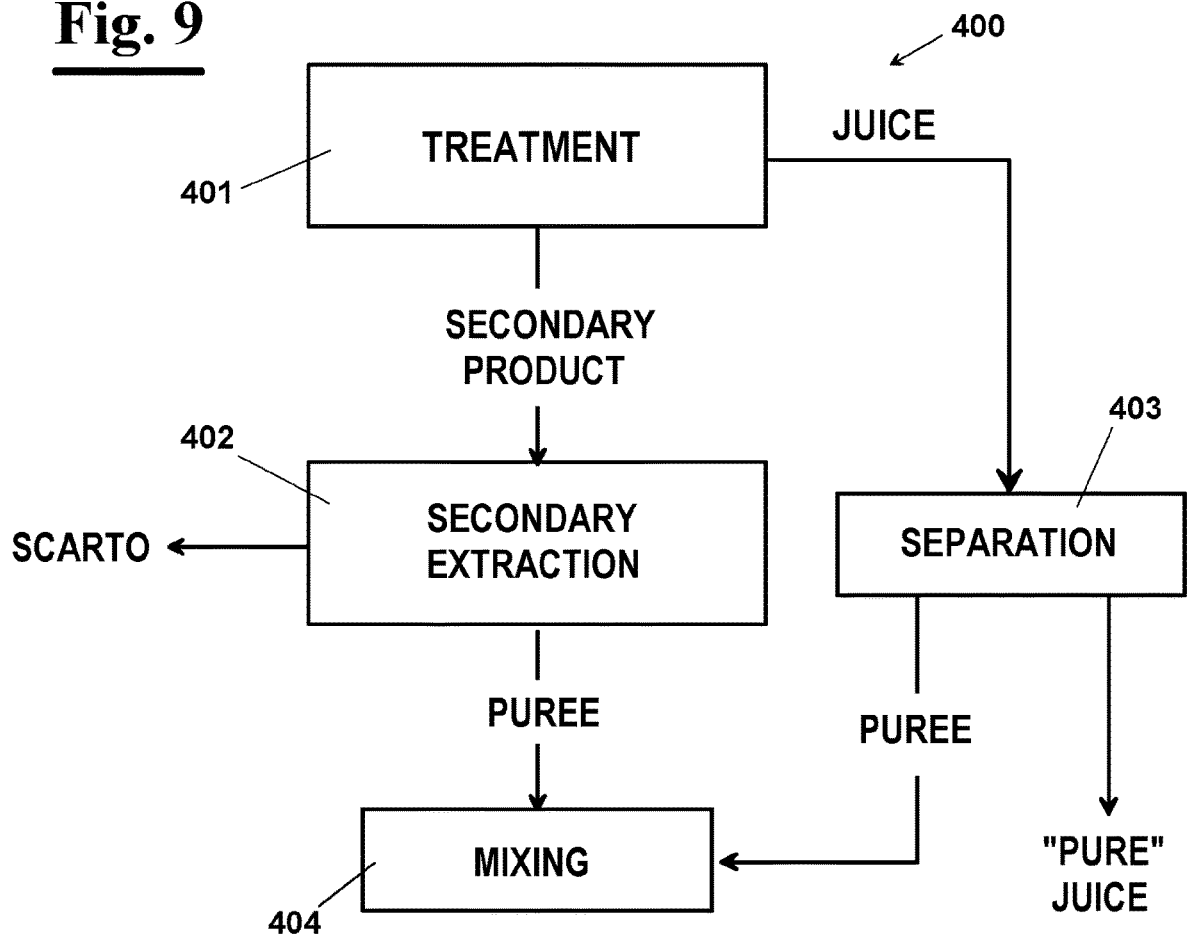

In the further alternative embodiment of FIG. 9, the method 400 provides to subject the main product obtained in the treatment step 401, i.e. the juice, to a dividing step, block 403, analogous to that one described above with reference to FIGS. 6 and 7, in order to divide the juice from a more solid fraction which has passed through the holes 25 of the machine for treating together with the juice and that is essentially constituted from a determined quantity of puree. Furthermore, a mixing step can be advantageously provided for mixing the puree deriving from the aforementioned secondary extraction step, with the puree coming from the dividing step block 404.

Figure 10:
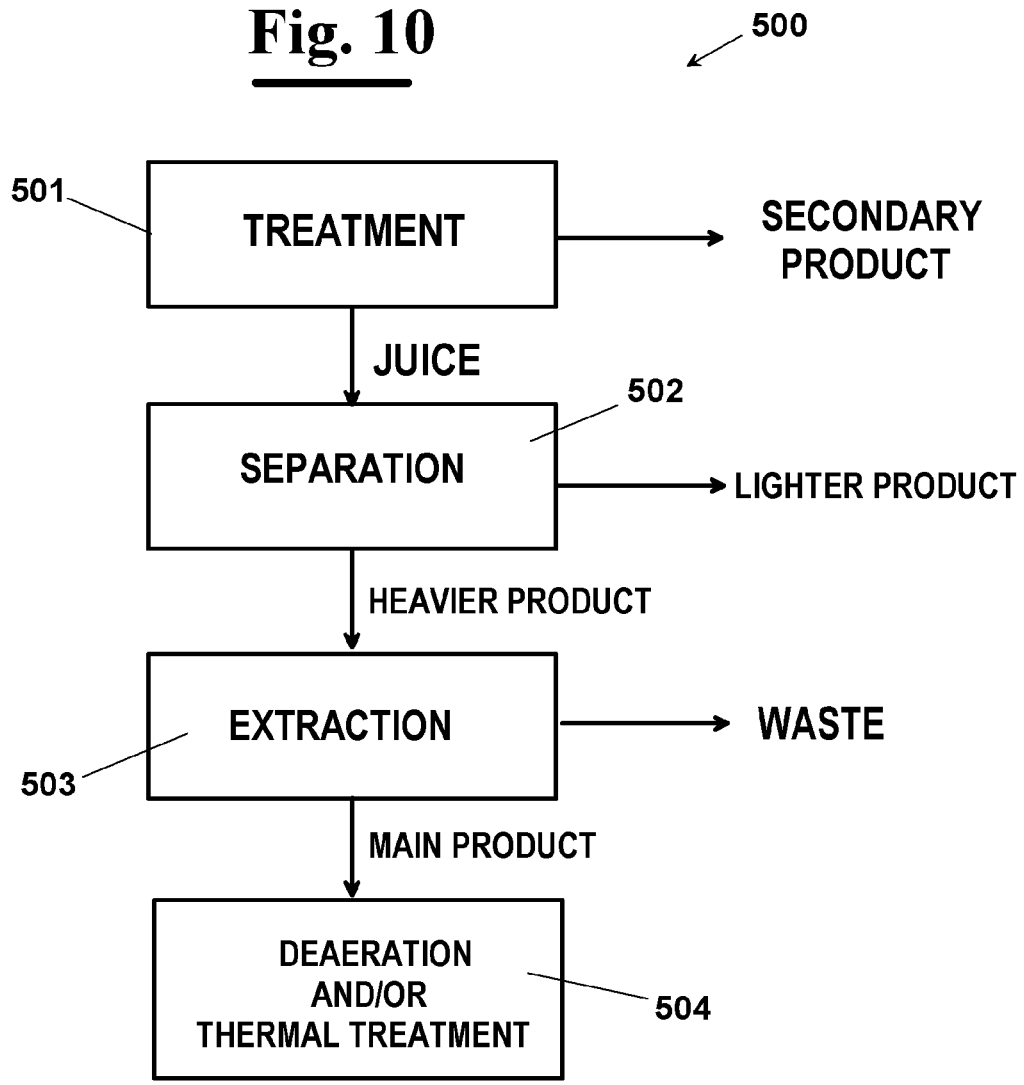

In a further alternative embodiment that is shown in FIG. 10, a starting treatment step is provided, block 501, as described above. The juice obtained in the treatment step is, then, subject to a dividing step, block 502, for example carried out in a centrifuge, or a decanter, to divide the juice in a heavier product (mainly skins and seeds) and a lighter product (mainly juice). An extraction step, block 503, follows of the heavier part exiting the dividing step obtaining a main product, juice and/or puree, and a waste product. The main product is, then, subject to a deaeration step and/or a thermal treatment step, in particular an inactivation temperature, block 504.

Figure 11:
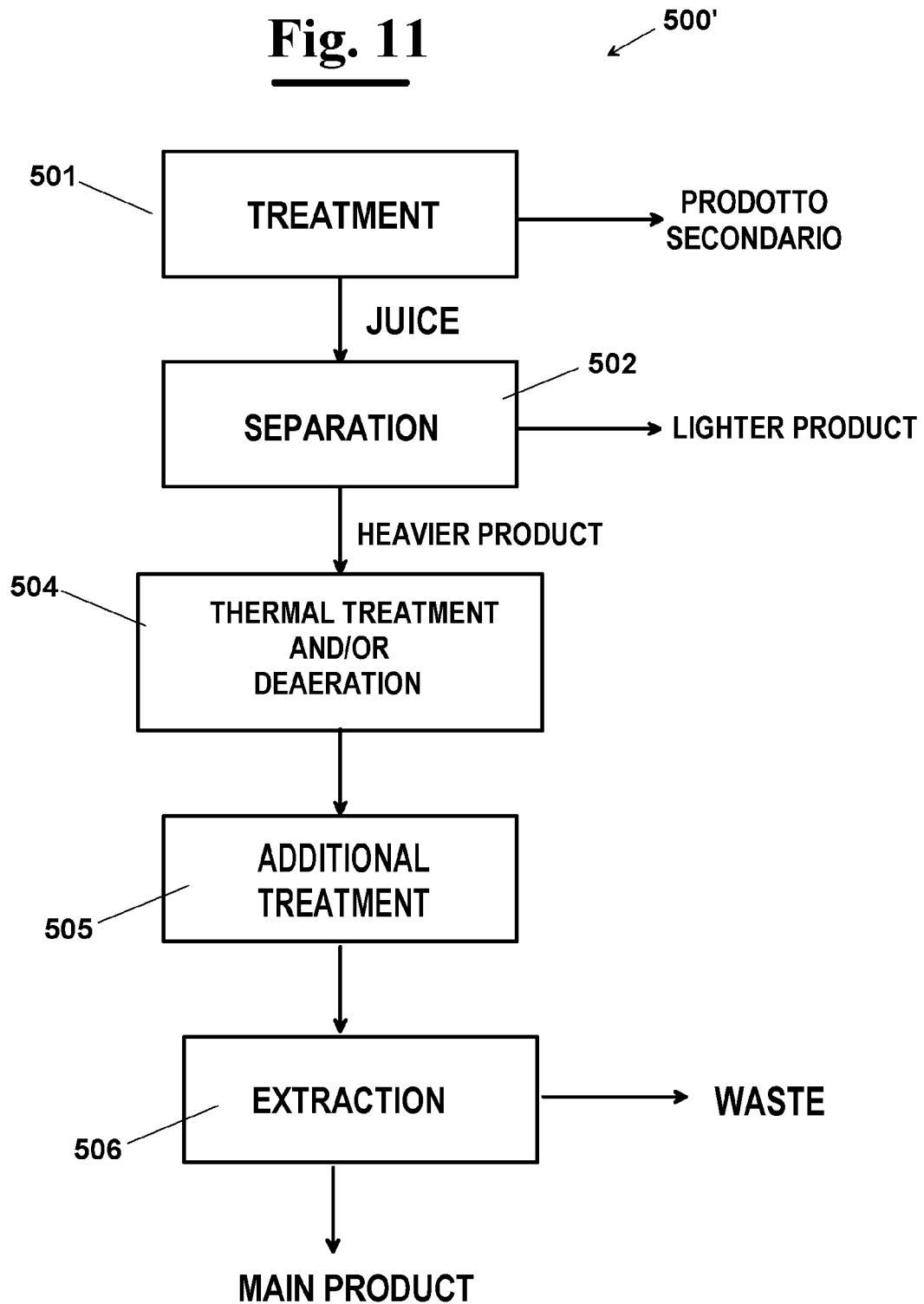

In a further alternative embodiment shown in FIG. 11, after the treatment and separation steps analogous to those described above with reference to FIG. 10, the heavier product is subject, at first, to a deaeration step and/or a thermal treatment, in particular an inactivation temperature, block 504, and, then, an additional treatment is provided, advantageously a treatment with presses, or enzymes, block 505, and the successive extraction step, 10 block 506.

According to a further aspect of the invention, a plant for producing juice starting from a food product of vegetable origin comprises at least a machine for treating as described above with reference to the figures from 1 to 5, and at least a machine for carrying out one of the aforementioned steps according to the methods for producing juice described above with reference to FIGS. 5 to 6 and 8 to 11, in particular at least an extraction machine positioned downstream of the machine for treating and/or a secondary extraction machine if within the machine for treating 1 a fixed body 20 is provided having holes 25, and/or a machine for carrying out deaeration, and/or a machine for the aforementioned thermal treatment, and/or a division machine, in particular a centrifuge, or a decanter and/or a press and/or a machine for the treatment with enzymes.

As diagrammatically shown in FIG. 12, the fixed hollow body 20 can comprise a plurality of protruding portions 22, whose tops are arranged to lay on a first circumference γ1 having a first radius r1, alternating with a plurality of recessed portions 23, the bases of which are arranged to lay on a second circumference γ2 having a second radius r2, with r2<r1. In particular, the difference between the first and the second radius r2 is equal to a predetermined value Δr. In particular, the aforementioned value Δr can be set between 0.3 mm and 3 mm. Therefore, the motor group 80 can be configured to cause the rotor 30 to rotate, in such a way that the product of the diameter φr, of the rotation speed vr of the rotor 30, and said predetermined value Δr, i.e. φr·vr·Δr, can be set between 240000 and 1500000 turns·mm²/min. For example the aforementioned difference of radius Δr between the two circumferences γ1 and γ2 can be equal to 0.3 mm. Therefore, the aforementioned product can be equal to 240000 turns mm²/min.

Advantageously, the aforementioned speed of the rotor 30 can be set between 1800 and 2500 turns/min. In particular, the aforementioned diameter of the fixed hollow body 20 can be set between 200 and 1000 mm, advantageously set between 300 and 500 mm.

As diagrammatically shown in FIG. 13, according to a possible embodiment, the fixed hollow body 20 can be provided with an internal surface 21 and the rotor 30 can be provided with an external surface 31 arranged to face one another. In particular, the internal surface 21 of the fixed hollow body 20, and the external surface 31 of the rotor 30 can be configured in such a way to cause at least an inversion of direction, in particular from a centrifugal direction to a centripetal direction, or vice versa, of the treated product at each predetermined number of turns, for example at each turn, of the rotor 30 about its rotation axis. In particular, the interspace between the rotor 30 and the fixed hollow body 20, i.e. the distance between le blades of the rotor 30 and the internal surface 21 of the fixed hollow body 20 can be set between 0.1 mm and 5 mm. More in particular, if the internal surface 21 of the fixed hollow body 20 is not provided with the aforementioned protruding portions 22 alternating with the aforementioned recessed portions 23, the aforementioned interspace is, advantageously, set between 0.1 mm and 0.6 mm, preferably between 0.2 mm and 0.5 mm.

As diagrammatically shown in FIG. 13, the aforementioned result can be, for example, obtained providing a particular geometry of the internal surface 21 of the fixed hollow body 20 comprising at least a first portion 21 a, for example half of the internal surface 21, of elliptical, or oval, shape and, for example, a second portion 21 b of circular shape. According to an alternative embodiment of the invention, not shown in the figure, the whole internal surface 21 of the fixed hollow body can be of elliptical, or oval, shape. In FIG. 13 are diagrammatically depicted the pressure lines generated on the particles of the treated product due to the particular geometry described above of the internal surface 21 of the fixed hollow body 20. More precisely, FIG. 13 qualitatively shows the profile of the pressures generated on the treated product after a turn of the rotor 30, and in particular the passage from a substantially centripetal direction of the pressure lines 121, to a substantially centrifugal direction of the pressure lines 122.

According to a further alternative embodiment of the invention, which is diagrammatically shown in FIGS. 14A and 14B, the fixed hollow body 20 can be provided with an internal surface 21 comprising a plurality of impact surfaces 24 against which the plurality of blades 35 of the rotor 30 is arranged to push the treated food product in such a way to subject the same to a succession of collisions and, therefore, to cause the containment part of the food product to be broken, and the liquid fraction to exit. Advantageously, two successive impact surfaces 24 of the aforementioned plurality of impact surfaces 24 are connected by a connection surface 26, in particular defining a recess portion with respect to the impact surfaces 24. More in particular, each impact surface 24 can be oriented, in such a way to define, with each blade 35 of the rotor 30, a predetermined impact angle α. This can be advantageously set between 0° (case diagrammatically shown in FIG. 14A) and 45°.

In particular, in a possible embodiment, the aforementioned product of the diameter φr and the rotation speed vr (φr·vr) of the rotor 30 can be set between 700000 and 3000000 r.p.m·mm, advantageously set between 700000 and 2500000 r.p.m·mm. In fact, in determined operation conditions, it is suitable not to overcome determined values of the aforementioned product to avoid deteriorating the treated product and to compromise the organoleptic properties of the final juice.

More in particular, the aforementioned product of the diameter φr and the rotation speed vr (φr·vr) of the rotor 30 can be set between 750000 and 1300000.

Advantageously, in case of a machine comprising a fixed body 20, which does not provide with protruding portions alternating with the aforementioned recessed portions, for example in case of sieve for extractors, the aforementioned product of the diameter ϕr and the rotation speed vr (ϕr·vr) of the rotor 30 can be set between 1000000 and 3000000 r.p.m·mm, advantageously between 1200000 and 1300000 r.p.m·mm. Instead, in the case a machine comprising a fixed body 20 having the aforementioned internal surface 21 provided with the aforementioned protruding portions alternating with the aforementioned recessed portions, the aforementioned product of the diameter ϕr and the rotation speed vr (ϕr·vr) of the rotor 30 can be set between 700000 and 1500000 r.p.m·mm, advantageously between 750000 and 1200000 r.p.m·mm. In fact, in general, in the case in which any protruding portion is not present, i.e. the protruding portions alternating with recessed portions, will be necessary to operate at speeds higher than the case in which the internal surface 21 of the fixed body 20 is not provided with the same.

In particular, as diagrammatically shown in FIG. 14B, the blades 35 of the rotor 30 can comprise a base portion 35a, which is closer to the motor shaft 85, and an end portion 35b, which is farther from motor shaft and closer to the internal surface 21 of the fixed hollow body 20. More in particular, the base portion 35a of the blades 35 can be substantially positioned along a radial direction, whilst the end portion 35b can be positioned along a direction, which forms the aforementioned impact angle α with respect to the impact surfaces 24.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A machine for treating a food product of vegetable origin, said machine comprising:
   a treatment section provided with an inlet for introducing said food product of vegetable origin to be treated and with at least an outlet for discharging a treated product, wherein:
      said treatment section is equipped with:
         a fixed hollow body having a cylindrical or conical shape, and
         a cylindrical rotor having a predetermined diameter ϕr, or
         a conical shaped rotor having a predetermined minimum diameter ϕr,
      said rotor is mounted within said fixed hollow body and is provided with a plurality of blades,
      said rotor is operatively connected to a motor group configured to cause said rotor to rotate about a rotation axis at a predetermined rotation speed vr expressed in r.p.m., and
      said motor group is configured to cause said rotation of said rotor in such a way that the product (ϕr·vr) of said diameter, or minimum diameter ϕr, and said rotation speed vr of said rotor is greater than 700000 r.p.m·mm, whereby the food product of vegetable origin is subject to a dynamic compression force, which causes the containment part of the food product to be broken and the liquid fraction, or juice, which is contained within the containment part of the food product to exit outside;
   and wherein:
      said rotor is operatively connected to a motor shaft of said motor group by a connection group comprising:
         a hub mounted on said motor shaft;
         a hollow connection member mounted on said hub and arranged to engage said motor shaft by said hub, said hollow connection member being peripherally provided with said plurality of blades; and
      hydraulic sealing elements are provided between said connection group and a flange arranged to operatively connect said motor group and said treatment section.

2. The machine for treating, according to claim 1, wherein said product (ϕr·vr) of said diameter, or said minimum diameter, ϕr and of said rotation speed vr of said rotor is set between 700000 and 3000000 r.p.m·mm.

3. The machine for treating, according to claim 2, wherein said product (ϕr·vr) of said diameter, or of said minimum diameter, ϕr and of said rotation speed vr of said rotor is set between 750000 and 1300000 r.p.m·mm.

4. A machine for treating, according to claim 1, wherein:
   said fixed hollow body is provided with a plurality of holes of a predetermined diameter,
   said rotor is configured to rotate within said fixed hollow body to push said treated food product of vegetable origin against said fixed hollow body, in such a way to divide said food product of vegetable origin in:
      a first portion, more liquid, which passes through said holes of said fixed hollow body and is discharged from said machine through a first outlet, and
      a second portion, more solid, which, instead, does not pass through said holes of said fixed hollow body and is discharged through a second outlet positioned downstream of said first outlet with respect to the advancing direction of said treated food product of vegetable origin.

5. The machine for treating, according to claim 1, wherein said predetermined diameter, or said minimum diameter, ϕr of said rotor is set between 250 mm and 1000 mm.

6. The machine for treating, according to claim 1, wherein:
   said fixed hollow body provides an internal surface,
   said rotor provides an external surface arranged to face towards said internal surface of said fixed hollow body, and
   said internal surface of said fixed hollow body and said external surface of said rotor being configured in such a way to cause at least an inversion of direction from a centrifugal to a centripetal direction, or vice versa, of said treated product after a predetermined number of turn of said rotor about its rotation axis.

7. The machine for treating, according to claim 6, wherein at least one of said internal surface of said fixed hollow body and said external surface of said rotor is provided with a plurality of protruding portions alternating with a plurality of recessed portions.

8. The machine for treating, according to claim 7, wherein said internal surface of said fixed hollow body provides a plurality of recessed portions whose bottoms are arranged to lay on a first circumference γ1 having a first radius r1, alternating with a plurality of protruding portions whose tops are arranged to lay on a second circumference γ2 having a second radius r2, with r2<r1.

9. The machine ne for treating, according to claim 8, wherein:
said difference between said first and second radius r2 is equal to a predetermined value Δr and;
said motor group is configured to cause said rotation of said rotor in such a way that the product of said diameter φr and said rotation speed vr of said rotor and said predetermined value Δr, i.e. φr·vr·Δr, is set between 240000 and 1500000 turns mm²/min.

10. The machine for treating, according to claim 7, wherein the ratio between the circumferential distance between two successive protruding portions of said fixed hollow body and the depth of each recess portion of said fixed hollow body is set between 2 and 100.

11. A machine for treating a food product of vegetable origin, said machine comprising:
a treatment section provided with an inlet for introducing said food product of vegetable origin to be treated and with at least an outlet for discharging a treated product, wherein:
said treatment section is equipped with:
a fixed hollow body having a cylindrical or conical shape, and
a cylindrical shaped rotor having a predetermined diameter φr, or
a conical shaped rotor having a predetermined minimum diameter φr,
said rotor is mounted within said fixed hollow body and is provided with a plurality of blades,
said rotor is operatively connected to a motor group configured to cause said rotor to rotate about a rotation axis at a predetermined rotation speed vr expressed in r.p.m., and
said motor group is configured to cause said rotation of said rotor in such a way that the product (φr·vr) of said diameter, or minimum diameter φr, and said rotation speed vr of said rotor is greater than 700000 r.p.m·mm, whereby the food product of vegetable origin is subject to a dynamic compression force, which causes the containment part of the food product to be broken and the liquid fraction, or juice, which is contained within the containment part of the food product to exit outside;
and wherein said internal surface of said fixed hollow body comprises at least a portion having an elliptical, or oval, shape.

12. The machine for treating, according to claim 1, wherein:
said fixed hollow body provides a first internal surface comprising a plurality of impact surfaces against which said plurality of blades of said rotor is arranged to push said treated food product in such a way to subject the same to a succession of collisions and to cause, therefore, a containment part of the food product to be broken and the liquid fraction, or juice, contained in the same, to exit outside,
said plurality of impact surfaces is connected by a plurality of connection surfaces, and
each impact surface is oriented in such a way to define with each blade of said rotor a predetermined impact angle.

13. The machine for treating, according to claim 12, wherein said impact angle is set between 0° and 45°.

14. The machine for treating, according to claim 1, wherein the interspace, i.e. the distance between said blades of said rotor and said internal surface of said fixed hollow body, is set between 0.1 mm and 5 mm.

15. The machine for treating, according to claim 14, wherein the interspace is set between 0.1 mm and 0.6 mm.

16. A plant for producing juice starting from a food product of vegetable origin comprising:
a machine for treating, according to claim 1, and
a machine for dividing the treated product exiting said machine in a main part constituted from juice, and a secondary part, constituted from puree, skins, and seeds.

17. A method for producing juice starting from a food product of vegetable origin, said method comprising the steps of:
feeding said food product of vegetable origin to be treated in a treatment section comprising a fixed hollow body, cylindrical, or conical, shaped and a rotor cylindrical shaped and having a predetermined diameter φr, or conical shape and having a minimum diameter φr, said rotor being mounted within of said fixed hollow body and being provided with a plurality of blades; and
actuating a motor group operatively connected to said rotor and configured to cause a rotation of said rotor about a rotation axis and a predetermined rotation speed vr expressed in r.p.m. such that, during said rotation, the product of said diameter φr and of said rotation speed vr of said rotor, i.e. φr·vr, is greater than 700000 r.p.m·mm, whereby the food product of vegetable origin is subject to a dynamic compression force, which causes a containment part of the food product to be broken and a liquid fraction, or juice, contained in the same to exit outside;
and wherein said product exiting said treatment section, or said first portion of said product exiting said extraction section, or said thermally treated product exiting said thermal treatment section is subject to a dividing step to divide a lighter part, in particular the liquid fraction of said product, from a heavier part, in particular the solid fraction of said product, said dividing step being one of:
a centrifugation step;
a static sedimentation step;
a dynamic sedimentation step.

18. The method, according to claim 17, wherein said treated product exiting said treatment section is subject to an extraction step within an extraction section to divide the treated product in a first more liquid portion from a second more solid portion, said extraction section being equipped with:
a fixed sieve having cylindrical, or conical, shape, and provided with a plurality of holes having a predetermined diameter; and
a rotor configured to rotate within said fixed sieve to apply a centrifugal force on said treated food product of vegetable origin against said sieve, in such a way to divide said treated food product of vegetable origin:
in said first portion which passes through said holes of said fixed sieve and is discharged from said extraction section through a first outlet, and
said second portion which, instead, does not pass through said holes of said fixed sieve and is discharged through a second outlet positioned downstream of said first outlet with respect to the advancing direction of said food product of vegetable origin in said extraction section.

19. The method according to claim 17, wherein:
said first portion of product exiting said extraction section is subject to a deaeration step up to reach a predetermined vacuum degree, and
said deaerated product is then subjected within a thermal treatment section to a thermal treatment selected from the group consisting of:
  an activation temperature by heating the deaerated product up to an activation temperature between 50° C. and 60° C.; and
  an inactivation temperature by heating the deaerated product up to an inactivation temperature of between 85° C. and 95° C.

* * * * *